Patented May 19, 1925.

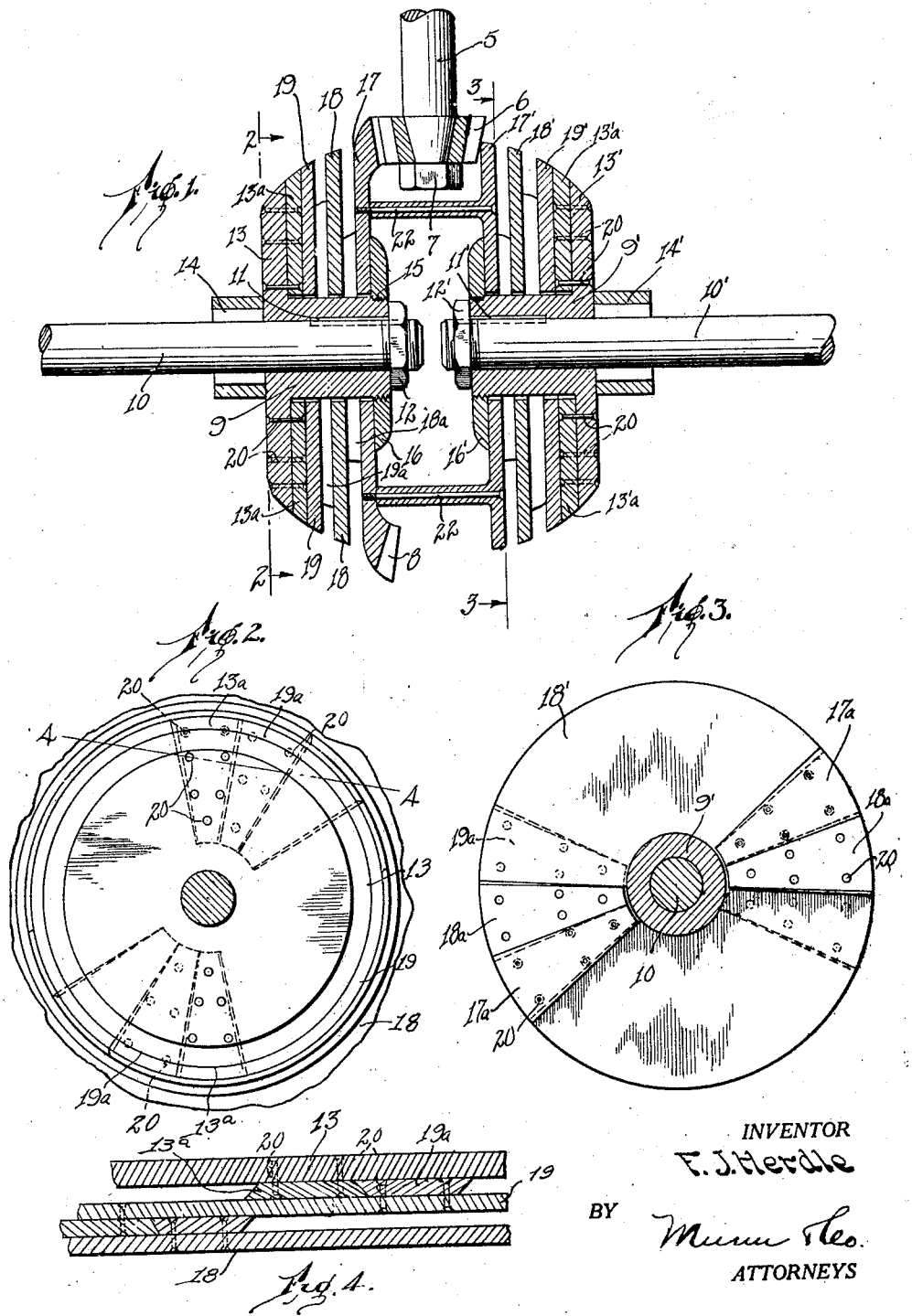

1,538,810

UNITED STATES PATENT OFFICE.

FREDERICK JOSEPH HERDLE, OF CHICAGO, ILLINOIS.

DIFFERENTIAL.

Application filed January 31, 1924. Serial No. 689,805.

*To all whom it may concern:*

Be it known that I, FREDERICK JOSEPH HERDLE, a citizen of the United States, and a resident of Chicago, in the county of Cook and State of Illinois, have invented a new and useful Improvement in Differentials, of which the following is a full, clear, and exact description.

My invention relates to improvements in differentials, and more particularly those designed to be used in connection with automobiles, trucks and the like, and it consists in the combinations, constructions, and arrangements herein described and claimed.

It is well known that with the ordinary differential an automobile or truck, which has one wheel on hard ground and the other wheel in muddy or slippery ground, has a hard time to get started, because the wheel in the muddy or slippery ground will revolve idly, while the wheel on the hard ground is ineffective for causing sufficient traction to pull the vehicle out. This is one of the inherent defects of the ordinary differential.

My invention has for its primary object to provide a differential which will permit the wheels of the vehicle to round corners, the inner wheels being permitted to travel at a slower rate than the outer wheels, as with an ordinary differential, but in which a positive drive is produced after the wheels have made a definite number of revolutions.

A further object of my invention is to provide a differential with a positive drive, which is comparatively simple in construction, due to the fact that the necessity of a number of gears, such as is found in the ordinary differential, is eliminated.

A further object of my invention is to provide a device which is cheaper to build than the ordinary differential, and one which takes up less room, while transmitting as much power as the ordinary differential.

Other objects and advantages will appear in the following specification, and the novel features of the invention will be particularly pointed out in the appended claims.

My invention is illustrated in the accompanying drawings, forming part of this application, in which—

Figure 1 is a sectional view through a differential constructed according to my invention, Figure 2 is a section along the line 2—2 of Figure 1, looking in the direction of the arrow, Figure 3 is a section along the line 3—3 of Figure 1, looking in the direction of the arrow, and Figure 4 is a section along the line 4—4 of Figure 2.

In the drawings a final drive shaft is shown at 5. This is provided with a gear 6 which is held on the end of the shaft 5 in any suitable manner, as by means of a nut 7. The gear 6 is in mesh with a gear 8. This gear, as will be seen from Figure 1, is a beveled gear, and it is loosely mounted on a sleeve 9, which has a central bore through which an axle 10 extends. The axle is keyed to the sleeve, as shown at 11, and is held from outward longitudinal movement by means of a nut 12. The outer end of the sleeve 9 has an integral plate 13 which is held in position by means of a bearing 14. The sleeve 9 is threaded at 15 to receive a ring-shaped plate 16.

The body portion of the gear 8 is formed by a plate 17, and between the plate 17 and the plate 13 are two plates 18 and 19, both of these plates being provided with lugs, such as those shown at 18ª and 19ª respectively (see Figure 4). These lugs are in the form of plates which are preferably secured to the plates 18 and 19 by means of rivets 20, or in any other suitable manner. The plate 13 is provided with similar lugs 13ª which are adapted to engage the lugs 19ª. The edges of the lugs 19ª and 13ª are beveled, as will be seen from Figure 4, in such a manner that when the plates are moved relative to one another around the central axis, the engagement of the beveled edges will lock the adjacent plates together, and cause them to rotate as one. The plate 19 has on its opposite sides lugs similar to 19ª arranged to engage similar lugs on the plate 18, and the plate 18, in turn, is provided with similar lugs arranged to engage the lugs of the plate 17. These lugs are disposed on opposite sides of the center, as shown in Figure 2, so that the driving force which one plate impresses on the adjacent plate is eventually distributed about the center.

On the opposite side of the central axis of the shaft 5 is a plate 17'. This plate forms part of a housing which is connected to the plate 17 by means of bolts or rivets 22. A sleeve 9' is keyed to the shaft 10', by a key 11', and the sleeve is provided with an inner end plate 16' similar to the end plate 16, the bearing 12' being similar to the bearing 12, and the bearing 14' which abuts the plate 13' being similar to the bearing 14. The plates 18' and 19' are similar to the plates 18 and 19. The differential thus described may be disposed in any suitable housing (not shown).

From the foregoing description of the various parts of the device, the operation thereof may be readily understood. Let us assume that the drive shaft is turning the gear 8 in a direction which will cause the normal movement of the vehicle. Through the movement of the gear 8, the plates 17 and 17' will turn until their lugs will engage those of the plates 18 and 18' respectively. These will then turn until the lugs on the plates 19 and 19' are engaged, and the latter plates will turn until they engage the lugs on the plates 13 and 13'. This will cause the turning of the axles 10 and 10'.

When now the vehicle is turning a corner the wheel on the outer side will, of course, travel faster than that on the inner side. In the figure, let us assume that the wheel on the axle 10' is on the inner side and the wheel on the axle 10 on the outer side. The axle 10 then will be turning faster than the gear 17 is being driven. This will cause the contacting lugs on the plates 13, 19 and 18 to separate successively, until the vehicle straightens away, when they will be brought into contact again by the continued rotation of the gear 17.

As shown in the drawings, the plates will rotate half a revolution before engaging the lugs of the adjacent plates, so that the vehicle has plenty of time not only to turn a corner, but to turn completely around during the shifting of the plates relatively to one another. This provision for compensating during the travel of the wheels around the corner gives to this device this differential effect. One of the main purposes, however, of the device is to provide a positive drive under circumstances where a differential will be ineffective. Take, for instance, the case where one wheel is in a slippery or muddy place, for instance; the wheel on the axle 10'. With the ordinary differential, if the wheel on the axle 10 is on a hard road, it will be held still, and the wheel on the slippery place will be driven around, but with little or no tractive effect.

In the present instance, however, should such a condition arise, the wheel on the slippery place cannot spin idly, without tractive effect on the opposite wheel, because the opposite wheel will be positively driven, and this tractive effect will pull the vehicle out of many places where the ordinary differential is entirely ineffective.

As stated before, the device is cheap to build, because it obviates the necessity of expensive gear cutting. With the exception of the two gears mentioned, the driving members are placed with lugs secured thereto, which is a simple construction compared to the ordinary differential.

The device, of course, works equally as well during the reverse movement of the drive shaft. In each of these movements, the inner plates are driven for a certain distance, and then the outer plates are driven successively, until the drive shaft is finally driven positively at the same rate of speed as that of the inner plates 17 or 17'.

I claim:

1. A device of the type described, comprising a drive shaft, a pair of axles disposed on a common axial line at right angles to the axis of the drive shaft, a gear carried by said drive shaft, plates loosely mounted to revolve about the axis of said axles, said loosely mounted plates being rigidly secured together, a plate rigidly secured to each of said axles, intermediate plates loosely mounted between said rigidly secured plates and said first named loosely mounted plates, and means carried by said plates for engaging the adjacent plate to transmit movement from said drive shaft to said axles.

2. In a device of the type described, a pair of axially alined axles, a drive shaft at right angles thereto, a gear on said drive shaft, a plate mounted loosely on each of said axles, said plates being rigidly secured together, a gear integral with one of said plates and arranged to mesh with said first named gear, a plate rigidly secured to each of said axles, and intermediate plates between said rigidly secured plate and said loosely mounted plates, each of said plates having lugs arranged to engage corresponding lugs on adjacent plates for transmitting power from said drive shaft to said axles.

3. In a device of the type described, a pair of axially alined axles, the ends of said axles being spaced apart, a drive shaft having its axis extending between the ends of said axles, a sleeve disposed on the end of each axle and having an integral plate extending radially at one end thereof, a plurality of plates loosely mounted on each sleeve, each plate having a plurality of lugs arranged to engage lugs on the adjacent plate, the adjacent loosely mounted plates on the axles being rigidly connected together, a gearing for communicating the movement of the drive shaft to one of said last named loosely mounted plates.

FREDERICK JOSEPH HERDLE.